(12) United States Patent
Lee

(10) Patent No.: US 9,626,071 B2
(45) Date of Patent: Apr. 18, 2017

(54) METHOD AND APPARATUS FOR MOVING ITEMS USING TOUCHSCREEN

(75) Inventor: Jae Myoung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 200 days.

(21) Appl. No.: 13/548,490

(22) Filed: Jul. 13, 2012

(65) Prior Publication Data

US 2013/0024821 A1 Jan. 24, 2013

(30) Foreign Application Priority Data

Jul. 19, 2011 (KR) .................. 10-2011-0071313

(51) Int. Cl.
*G06F 3/0481* (2013.01)
*G06F 3/0482* (2013.01)
*G06F 3/0486* (2013.01)
*G06F 3/0488* (2013.01)

(52) U.S. Cl.
CPC ........ *G06F 3/04817* (2013.01); *G06F 3/0482* (2013.01); *G06F 3/0486* (2013.01); *G06F 3/04883* (2013.01); *G06F 3/04886* (2013.01)

(58) Field of Classification Search
CPC .................................................. G06F 3/0482
USPC ....................................................... 715/863
See application file for complete search history.

(56) References Cited

U.S. PATENT DOCUMENTS

| 6,301,586 B1 * | 10/2001 | Yang et al. |
| 2005/0283742 A1 * | 12/2005 | Gusmorino et al. .......... 715/839 |
| 2006/0036568 A1 * | 2/2006 | Moore et al. .................... 707/1 |
| 2006/0242604 A1 * | 10/2006 | Wong et al. .................. 715/854 |
| 2008/0143685 A1 | 6/2008 | Lee et al. |
| 2012/0084689 A1 * | 4/2012 | Ledet .................... G06F 3/0486 715/769 |

FOREIGN PATENT DOCUMENTS

KR   10-2010-0137861 A   12/2010

OTHER PUBLICATIONS

Microsoft Windows 7 Service Pack one available in 2009 (Microsoft).*
Microsoft in view of Microsoft® Windows 7 in Depth by: Robert Cowart; Brian Knittel Publisher: Que Pub. Date: Aug. 31, 2009.*
Screenshots of Microsoft Windows 7 Service Pack one available on or before May 27, 2010 as demonstrated by included dated material (pp. 7-9).*

(Continued)

*Primary Examiner* — William Bashore
*Assistant Examiner* — Nathan Shrewsbury
(74) *Attorney, Agent, or Firm* — Cha & Reiter, LLC

(57) ABSTRACT

A method for moving or copying displayed items in response to at least one touch event on a touch screen is provided. The method comprises: detecting a user selection of one or more items; displaying an object corresponding to the one or more selected items at a predetermined location; moving the object to a point selected by the user; and moving the selected one or more items in association with the object. The object can be a convergence of a first object depicting a number representing a numerical count of the selected items, and a object visually representing the items.

18 Claims, 13 Drawing Sheets

(56) References Cited

OTHER PUBLICATIONS

Capture of Microsoft 7 SP1 documentation from archive.org (http://w w w .computerperformance.co.uk/w indow s7/w indow s7_sp1.htm).*

Precise Manipulation of GUI on a Touch Screen with Haptic Cues presented by MIT at the Third Joint Eurohaptics Conference and Symposium on Haptic Interfaces for Virtual Environment and Teleoperator Systems Salt Lake City, UT, USA, Mar. 18-20, 2009 (Kyung).*

Microsoft® Windows 7 in Depth by: Robert Cowart; Brian Knittel Publisher: Que Pub. Date: Aug. 31, 2009. (Cowart) pp. 1-3.*

YouTube Video of Microsoft Windows Functionality—(https://www.youtube.com/watch?v=jWQqGH9hxEU) Available as of Aug. 13, 2009.*

* cited by examiner

FIG. 13
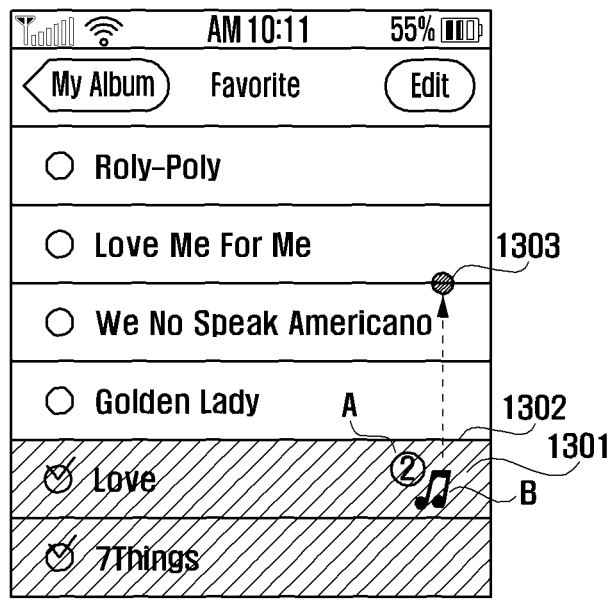
(a)
(b)

METHOD AND APPARATUS FOR MOVING ITEMS USING TOUCHSCREEN

CLAIM OF PRIORITY

This application claims the benefit under 35 U. S. C. §119(a) of a Korean patent application filed in the Korean Intellectual Property Office on Jul. 19, 2011 and assigned Serial No. 10-2011-0071313, the entire disclosure of which is hereby incorporated by reference.

BACKGROUND

Technical Field

This disclosure relates to a method and apparatus for moving items, and more particularly, to a method and apparatus for moving items in response to a touch event generated in a touch screen.

Description of the Related Art

Recently, the portable terminal market has been rapidly growing due to various advances, designs and applications which are arousing customers' purchasing needs. In particular, unlike basic mobile phones, smart phones can download and install various applications for taking photos or video, replaying audio and video files, playing online games, listening to a broadcast, obtaining email, using a social network service, etc. Various items are being produced and downloaded from the network by such applications. Hence, a portable terminal generally includes a touch screen and provides a user interface technology that can manage items through the touch screen. However, according to conventional user interface technology, when several items are moved or copied, the screen needs to be frequently switched or folders need to be frequently moved.

SUMMARY

Disclosed herein are a method and apparatus for moving or copying items to a desired folder using a simple touch operation.

In accordance with an aspect, a method for moving or copying displayed items in response to at least one touch event on a touch screen includes: detecting a user selection of one or more items; displaying an object corresponding to the one or more selected items at a predetermined location; moving the object to a point selected by the user; and moving or copying the selected one or more items in association with the object.

In some implementations, the object can be generated as a convergence of a first object that includes a number representing a numerical count of the items, and a second object such as a stack of the items or an icon that visually represents the items.

BRIEF DESCRIPTION OF THE DRAWINGS

The above features and advantages of the present invention will be more apparent from the following detailed description in conjunction with the accompanying drawings, in which:

FIG. 13 illustrates a user interface moving or copying items according to further exemplary embodiment.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

An apparatus for moving items according to an exemplary embodiment can be a terminal including a touch screen, and can be applied to various information communication devices and multimedia devices such as an MP3 player, a portable multimedia player (PMP), a personal digital assistant (PDA), a tablet personal computer, a mobile phone and a smart phone, etc. In the explanation below, it is assumed that the portable terminal is a smart phone; however, it is understood that other implementations are contemplated.

Figure 1:
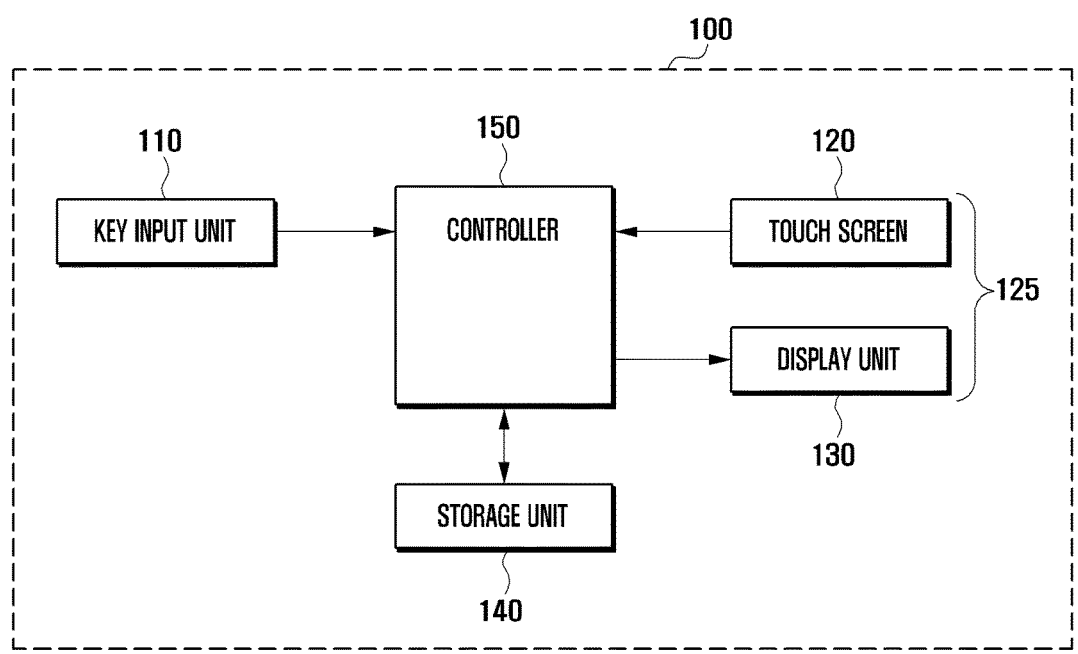
FIG. 1 illustrates a functional block diagram of an apparatus for moving items according to an exemplary embodiment.

FIG. 1 illustrates a functional block diagram of an apparatus, 100, for moving and copying items according to an exemplary embodiment. Herein, reference to "moving" an item will also include the capability of "copying" the item to a desired storage location, folder, or display area, where the decision to move or copy can be a choice made via user selection or default. Apparatus 100 can include a key input unit 110, a touch screen 120, a display unit 130, a storage unit 140 and a controller 150. The key input unit 110 can include a plurality of keys for operating apparatus 100, and transmits a key signal to the controller 150. Here, the key signal can be classified into a power on/off signal, a volume adjustment signal, and a screen on/off signal, etc.

Touch screen 120 and display unit 130 together comprise a touch screen display 125 (also referred to herein interchangeably as simply display 125); thus touch screen display 125 performs the dual function of displaying content and detecting touch-contact at locations corresponding to particular portions of the displayed content. Touch screen 120 generates a touch event and transmits the generated touch event to the controller 150. In the following description and definitions, a user's finger will be used as an example of a contact object to make touch contact with the touch screen 120 and control operations, but is understood that other contact objects, such as a pen pointer, can be used. A touch event can be classified into a touch, a tap, a press, a drag, a drag & drop, a flick and a drag & flick, etc. Here, a touch is a motion of contacting (or pushing) one point (a touch is often followed by a second operation, which converts a detection of the touch to a detection of the second operation). A tap is a motion of touching a point and then quickly releasing contact from the point. A press is a motion of touching for a time duration longer than a time duration associated with a tap, and then releasing contact without dragging one's finger during the process. A drag is a motion of moving a finger across the surface of the display while touching the display. A flick is a motion of quickly moving one's finger across the surface of the display while contacting the display, and then releasing contact. Controller 150 can distinguish a flick from a drag by the movement speed. A drag & drop is a motion of dragging and then releasing contact, to thereby "drop" an object/item to a location where contact was released or in a folder at the released contact location. A drag & flick is a motion of dragging and at a certain point, flicking (i.e., dragging and flicking are consecutively performed in the state where a finger contacts the touch screen display 125).

Further, a touch event according to embodiments can be classified into: i) an item selection event for selecting an item; ii), a thumbnail display event for displaying a thumb nail indicating a selected item; (iii) a first object display event for displaying a first object indicating the number (i.e., a numerical count) of multiple selected items; (iv) a second object display event for displaying a second object representing a selected item(s); (v) an object movement event for moving the second object and the first object from an item area to a folder area; (vi) an item copy event for copying the selected item and storing the selected item in a selected folder (vii) an item movement event for moving the selected item to the selected folder; as well as other possible touch events. Further, the touch event can be variously classified according to the position, direction, distance and pressure (the latter typically measured in time duration of a press). Here, the pressure represents a pressure applied to a surface of a touch screen when an object, such as a finger or stylus pen, presses down on the surface. The touch screen may be implemented with a pressure sensor. Accordingly, The touch screen can generate a touch event comprising position information(x, y) and pressure information(z). It is noted here that the touch screen 120 can be of the resistive type, capacitive type, pressure type, etc.

Herein, items refer to various sets of data which can be generated and stored by apparatus 100 via user commands, or data which apparatus 100 receives from a network, such as an image, a video file, an MP3 file, a multimedia file, a message, an e-mail, a document, a program file, etc. Further, the second object visually representing the selected item can be a stack type with converged thumbnails each respectively indicating a selected item (see FIG. 5, object 510 or 540), or an icon indicating the properties of the selected item (e.g., in case the selected items are letters, a letter icon can be the second object; see FIG. 11), etc.

The display unit 130 coverts image data inputted from the controller 150 into analog signals, and displays the analog signals. In particular, the display unit 130 according to embodiments divides the screen into a folder area and an item area, displays folders in the folder area and displays items included in the folder selected from the folders, and a sub-folder in the item area. Further, the display unit 130 according to embodiments displays selected items in a manner that emphasizes the item distinctly from other items according to the control of the controller 150. The display unit 130 can display a process of moving thumbnails respectively representing selected items to a certain point, and can converge the moved thumbnails into the second object and display the second object as a "grouped object" representing a group of items according to the control of the controller 150. The display unit 130 can display the first object indicating the number of selected items next to the second object according to the control of the controller 150. If the number of selected items is one, the display unit 130 can display the name of the selected item instead of the number. The display unit 130 can display the movement process of the second object and the first object according to the control of the controller 150 (for example, a path of a drag operation can be displayed).

The storage unit 140 stores programs and data which are necessary for operating apparatus 100, and can store operating systems, applications and items. Further, the storage unit 140 includes a main storage unit and a secondary storage unit. Here, the secondary storage unit may comprise a flash memory, and the main storage unit may comprise a RAM. The main storage unit is a space where an operating system and an application program are loaded. That is, when apparatus 100 is booted, the operating system is loaded from the secondary storage unit to the main storage unit, and then executed. Further, the application program (hereafter, "application" or "program", interchangeably) is executed in the state where the program is loaded from the secondary storage unit to the main storage unit. When execution of the program is terminated, the program is deleted from the main storage unit. Further, the secondary storage unit is a space where various applications and items are stored.

The controller 150 comprises at least one processor and controls general operation of apparatus 100 and a signal flow between internal blocks of apparatus 100. In particular, controller 150 according to embodiments runs an application program to divide the screen into a folder area and an item area, detect user selection of an item and highlight the selected item in response to the item selection event, display thumbnails in response to the thumbnail display event, display the second object in response to the second object display event, display the first object in response to the first object display event, display a process of moving the second object and the first object from the item area to the folder area in response to the object movement event, and store items in the folder in response to the event copy event or the item movement event. The function of moving items via controller 150 will be explained below in detail.

FIGS. 2 to 9 illustrate a method for moving items according an exemplary embodiment, which is implemented on apparatus 100 and referred to as a user interface of apparatus 100. Operations in the method are carried out under the control of controller 150 which running an application program for moving items in accordance with the embodiment. Accordingly, in the following description, operations such as displaying items, generating and moving objects, storing items, will be described primarily in terms of functionality, with the understanding that control of the various functions is carried out via controller 150. In most cases (excluding default operations), the functions are performed in response to user touch commands detected on touch screen display 125 and forwarded to controller 150.

Figure 2:
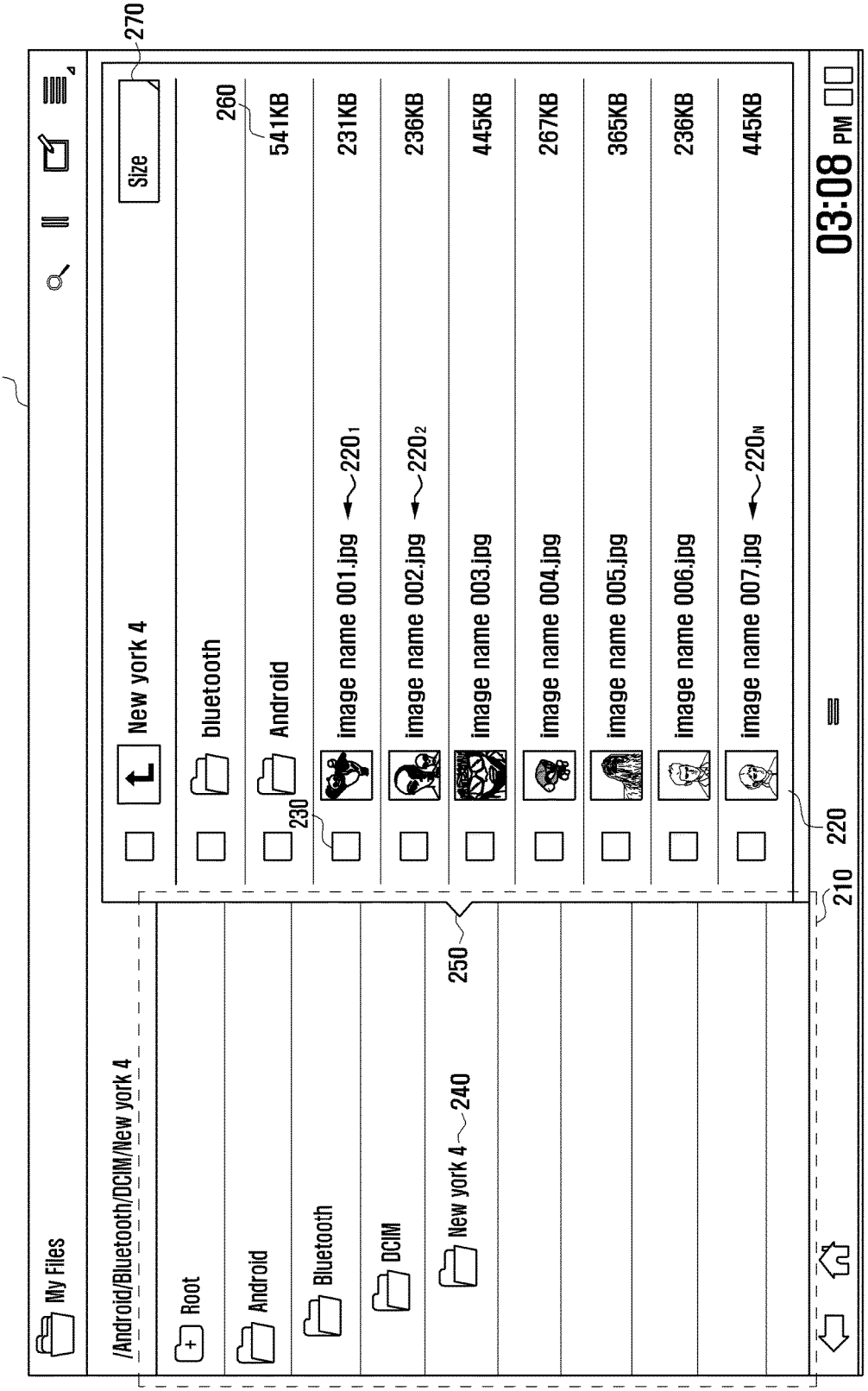
FIGS. 2 to 9 illustrate a user interface for moving or copying items according an exemplary embodiment.

Referring to FIG. 2, in response to a user command to access files stored in apparatus 100, display 125 divides the screen into a folder area 210 and an item area 220 (herein, "screen" refers to the visible presentation of touch screen display 125). In the example shown, a plurality of items $220_1$ to $220_N$ are displayed in item area 220, each having a check box 230 displayed adjacent thereto. When a user checks a check box 230, the adjacent item is selected for a subsequent action. In the example, the listed items $220_1$-$220_N$ are images already stored within a sub folder 240, which was previously selected by the user, resulting in the listing of the items in area 220 as shown. An indicator 250 at the boundary of folder area 210 and item area 220 can be provided to point to the sub-folder that is currently selected to display the listed items. Size information 260 can be provided indicating the size of the item on the same line as the information 260. An array button 270 can be provided on the upper side of the item area 220 so that items can be arrayed in an ascending or descending order according to the size, in accordance with user selection (in the shown example, no arraying has been chosen).

Figure 3:
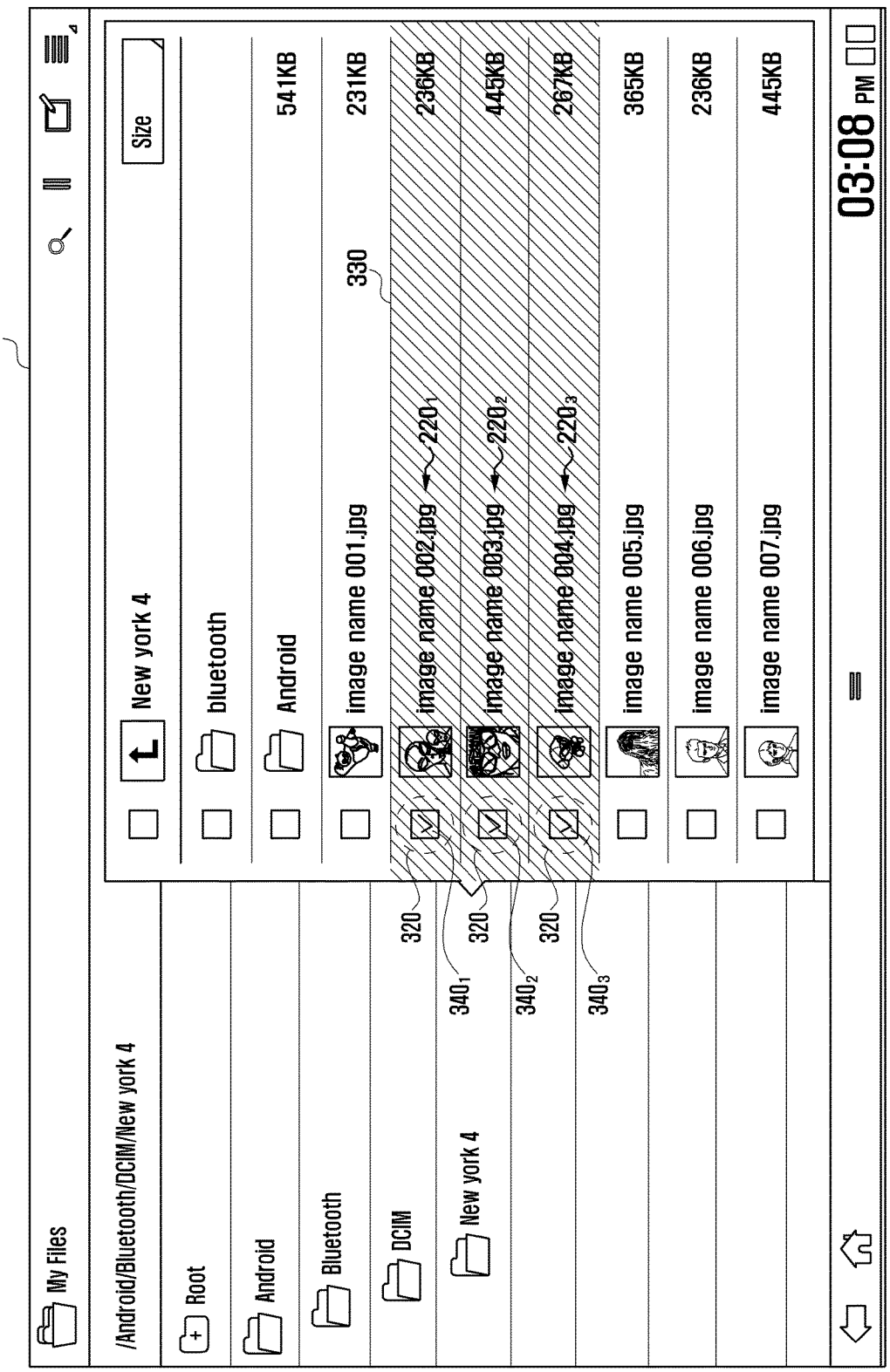

Referring to FIG. 3, the example screen of FIG. 2 is shown subsequent to an "item selection event" in which a user selected items $220_1$, $220_2$ and $220_3$ for a subsequent action. In response to the item selection event, controller 150 controls emphasizing, e.g., highlighting with a different color or shading, of the corresponding rows containing the listed items in area 330. As one example, the item selection event can be a tap, illustrated as a dashed circle, on a check box 340$i$ associated with the item 220$i$. In an example, the emphasis on the selected item can be implemented by displaying a checked check box 340$i$ as shown.

Figure 4:
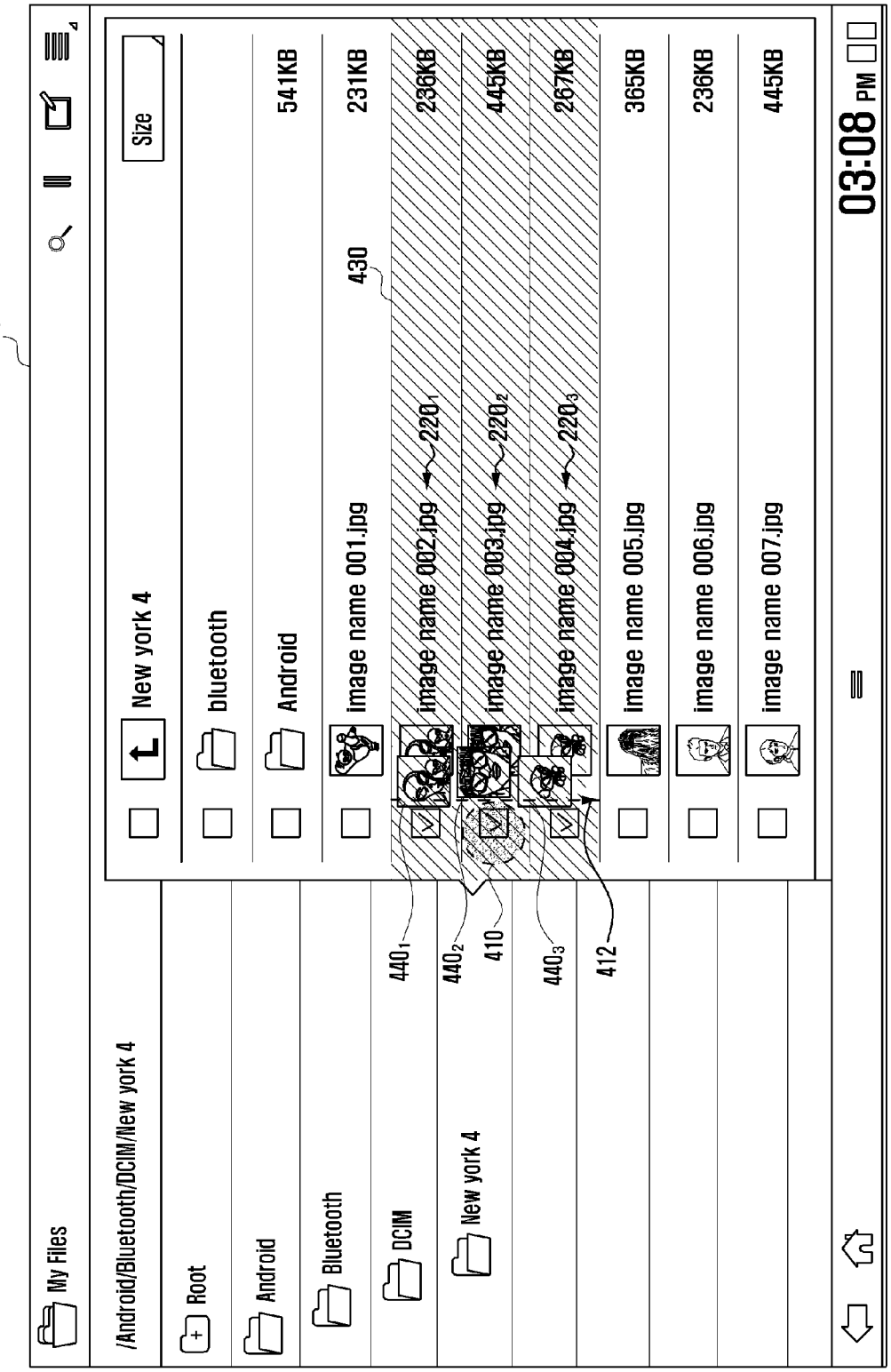

Referring to FIG. 4, the example screen of FIG. 3 is shown subsequent to a "thumbnail display event" causing thumbnails representing selected items to be generated and displayed. Here, the thumbnail display event can be a touch or a tap, illustrated as 410 on a predetermined location within a highlight display area 430, to generate a thumbnail. In one implementation, only one thumbnail such as $440_2$ is generated for each thumbnail event on an adjacent item $220_2$. In another implementation, multiple thumbnails, each corresponding to one of the previously selected items, are generated with a single thumbnail display event. In an implementation, the item selection as depicted in FIG. 3 and the thumbnail display as depicted in FIG. 4 may be the result of a consecutive process that is generated by one touch event. That is, the controller 150 controls an operation of detecting selected items, highlighting the selected items, and consecutively displaying a thumbnail 440$i$ for each selected item 220$i$.

Figure 5:
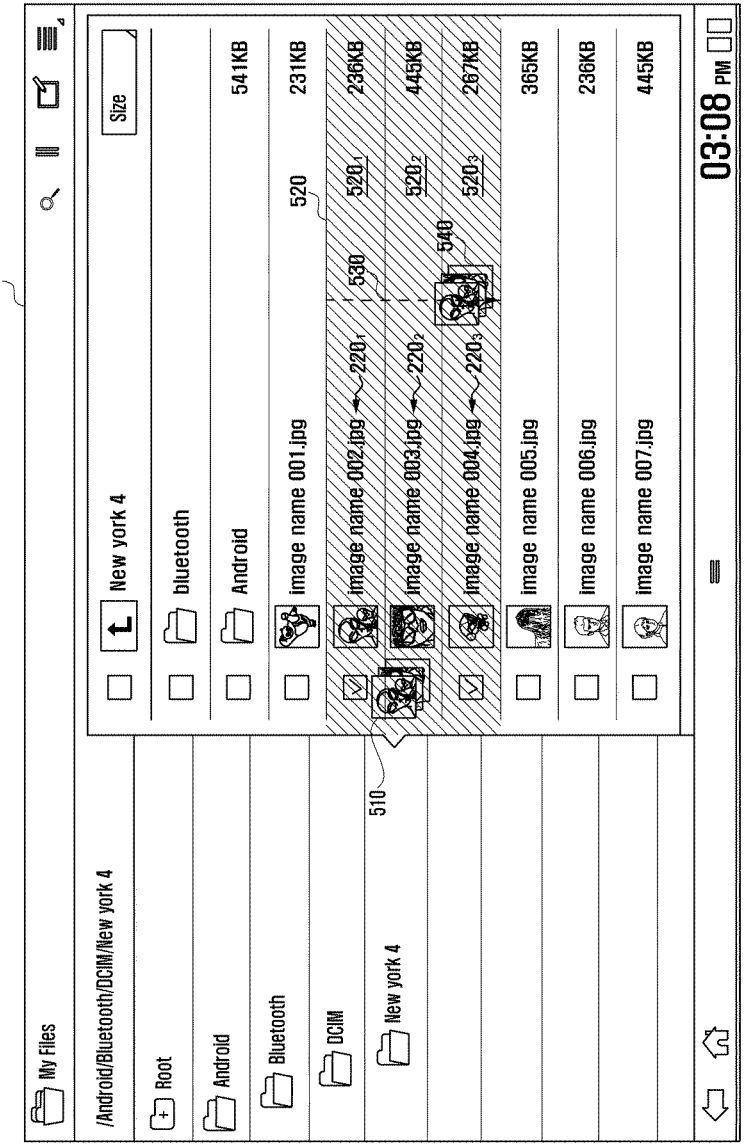

Referring to FIG. 5, the example screen of FIG. 4 is shown after a convergence of thumbnails into a single object has occurred in response to a "second object display event". (The converged object is referred to herein as a second object; examples of a "first object" will be described below.) That is, the controller 150 controls the display unit 130 to display thumbnails moved to a certain point as a second object 510. Here, the second object display event can be a touch or a tap at arbitrary points within a highlighted display area 520. As such, thumbnails are moved to a touched or tapped location, and are displayed as the second object 510. Further, the second object display and the thumbnail display can be consecutive processes. That is, referring to FIGS. 4 and 5, if a user touches or taps a predetermined location such as 410 within the highlight display area 430, thumbnails 440$i$ are displayed (i=any integer), thumbnails 440$i$ are moved to the location 410 at which the user touch/tap occurred, and are displayed converged as the second object 510. The convergence can occur as a result of a drag operation along e.g., path 412 in the region of the thumbnails 440$i$. It is also seen in FIG. 5 that the second object 510 can be a visual representation of all of the selected items as a group, e.g., a stack or cluster of items $220_1$, $220_2$, $220_3$, with a portion or entirety of each associated thumbnail $440_1$, $440_2$, $440_3$ being displayed in the stack.

Further, the item selection, thumbnail display and the second object display can be consecutive processes generated by one touch event. This is illustrated with the path 530 depicting a drag event that results in the generation and display of a second object 540 at the end of the drag, instead of second object 510 described above. That is, the controller 150 can control an operation of determining selected items in response to a drag 530, highlighting the selected items, consecutively displaying thumbnails, and displaying the second object 540 at the terminal point of the drag 530. In the example, the drag begins at region $520_1$ and ends at region $520_3$ as illustrated by path 530, whereby the thumbnail of the item $220_1$ at the beginning of the drag (and also the top item of the selected items) is displayed at the face of the stacked object 540. Other examples are alternatively possible.

Figure 6:
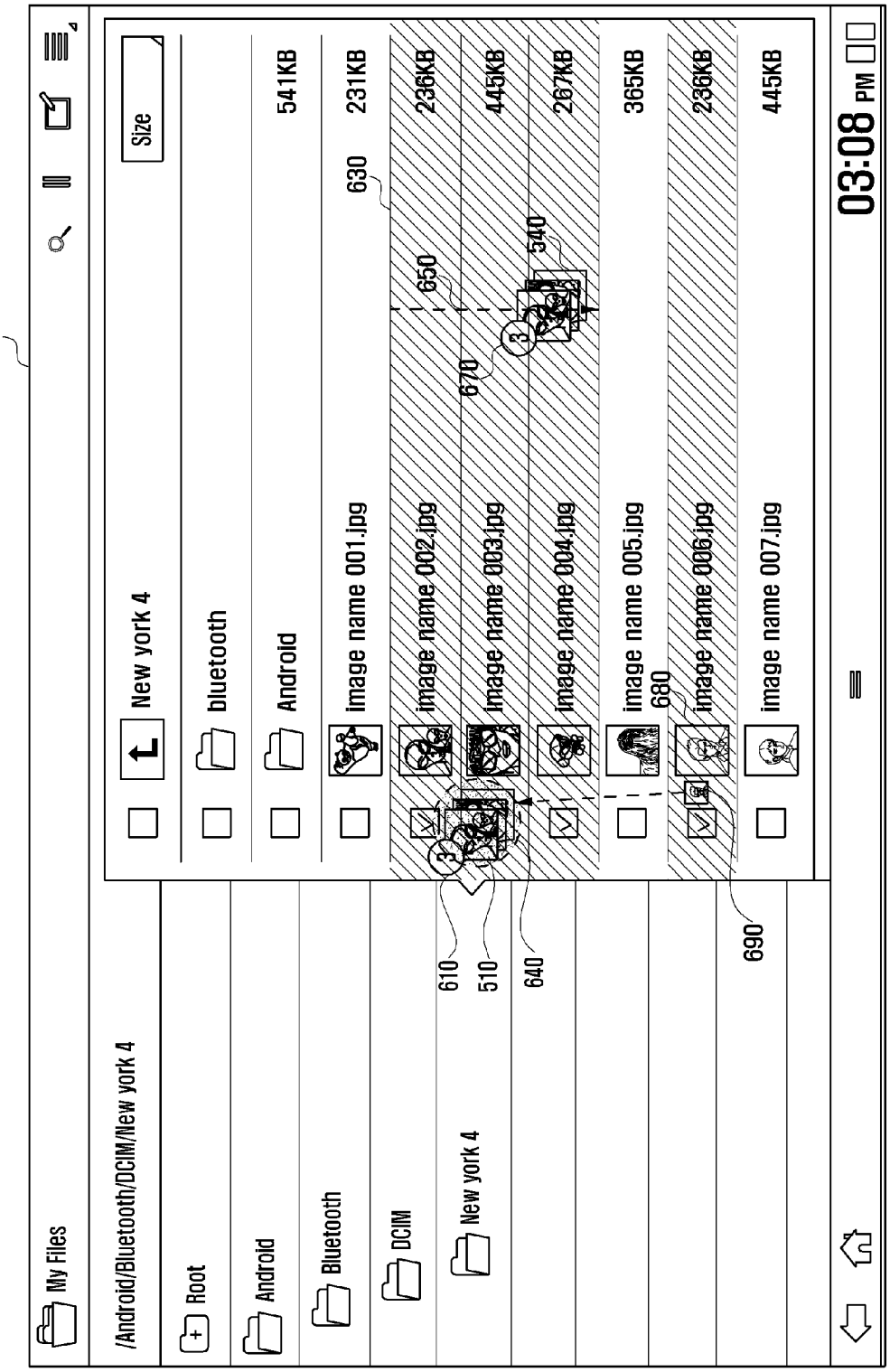

Referring to FIG. 6, the example screen of FIG. 5 is depicted after the occurrence of a "first object display event". With this event, a first object 610 representing the number of selected items is displayed next to the second object 510. (Or, in the case where second object 540 is generated due to a drag, a first object 670 is generated and displayed next to second object 540.) Here, the first object display event can be touch or a tap on a second object 510. As another example, the first object display event can be a flick or a drag from an item area to a folder area with the second object 510 as the start point. Further, the first object display and the second object display can be consecutive processes. That is, the second object 510 can be initially displayed at the same time that first object 610 is initially displayed in response to the second object display event. (In this case, the first object display event and the second object display event are considered a single object display event.)

In another embodiment variant, the thumbnail display, the second object display and the first object display can be consecutive processes generated by one touch event. That is, thumbnails can be displayed in response to a touch or a tap on an arbitrary location 640 within a highlight display area 630, consecutively move thumbnails to the touch-contacted location 640, display the moved thumbnails as the second object 510 and display the first object 610 next to the second object 510. In yet another variant, the item selection, the thumbnail display, the second object display, and the first object display can be consecutive processes generated by one touch event. For instance, in response to a drag 650, the selected items 2201-2203 within the drag region (i.e., selected via the drag movement) are designated as selected and highlighted, thumbnails corresponding thereto are displayed consecutively, and a first object 670 along with a second object 540 are displayed at the terminal point of the drag 650, all in one operation.

Further, referring to FIG. 6, the controller 150 controls to additionally select tapped items in response to a tap by another item 680, and highlight the additionally selected item(s) 680 that can be segregated from the other items $220_1$-$220_3$. Further, the controller 150 can control to display thumbnails 690 that represent additionally selected items 680, move the thumbnails 690 to the second object 620 to be included in the second object 620, and display the first object whose number has been increased by one. (Although not shown in FIG. 6, the addition of thumbnail 690 to the second object 510 would result in the number "3" of the first object 610 incrementing to "4" representing four objects.) Further, the controller 150 can cancel the selection of an item in response to a predefined user command, such as an additional tap on a previously selected item row. In this scenario, the controller 150 decrements the number displayed via the first object by one.

Figure 7:
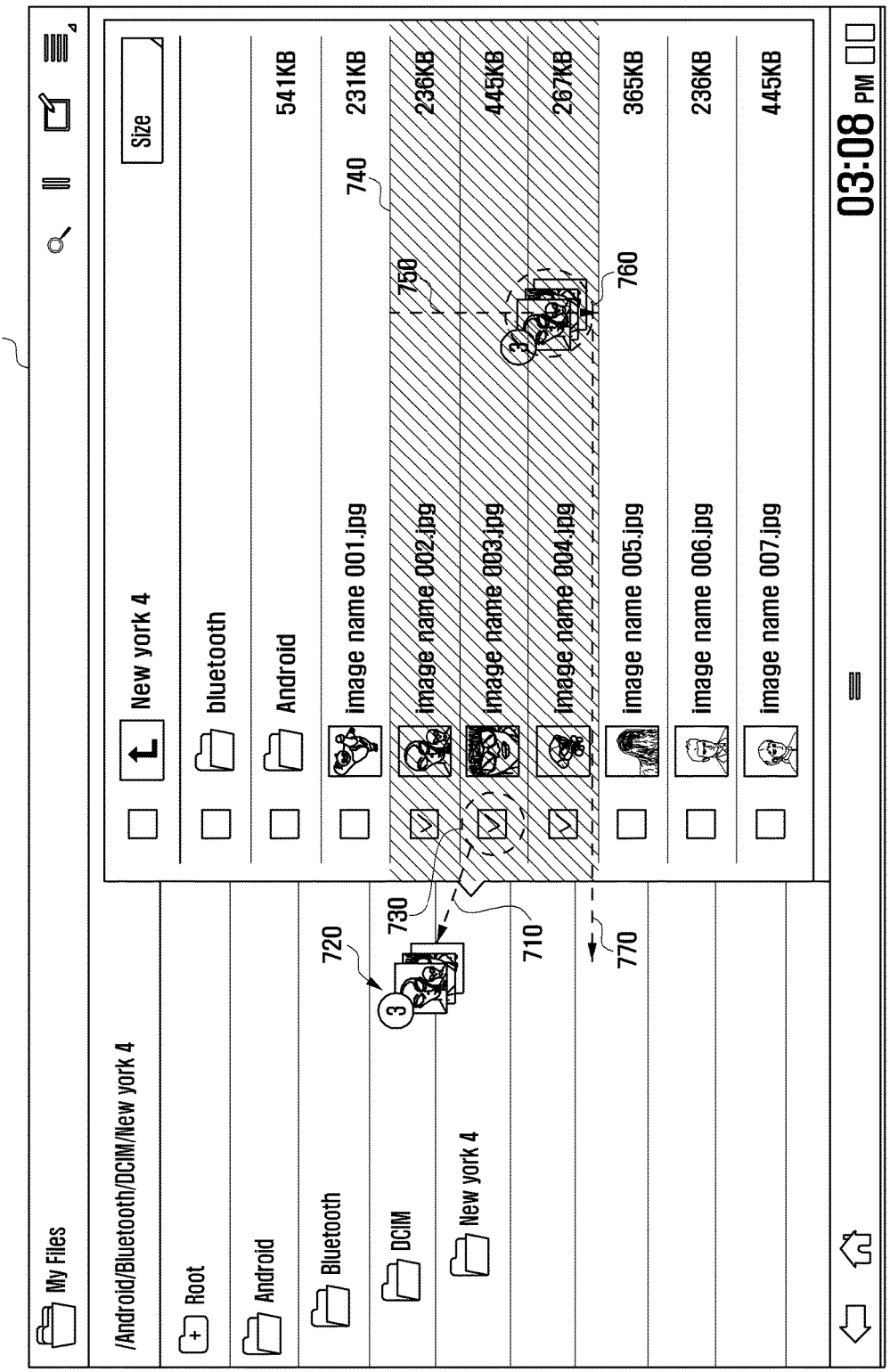

Referring to FIG. 7, the controller 150 controls the display unit 130 to display the process of moving an object 720 from the item area to the folder area in response to an "object movement event". Here, the object movement event can be a flick or a drag from the item area to the folder area with the point where the object 720 has been initially positioned as the start point. Further, the thumbnail display, the second object display, the first object display and the object movement can be consecutively generated by one touch event. That is, thumbnails can be displayed in response to a touch on an arbitrary point 730 within the highlight display area 630, the thumbnails can be moved to a corresponding point 730 consecutively, the first object displayed along with the second object at a corresponding point 730, and the object moved to the folder area in response to a drag or a flick with the corresponding point as the start point. Further, all the processes explained above with the item selection as a start can be consecutively generated by one touch event. For instance, items can be selected and highlighted in response to a drag 750, thumbnails displayed consecutively, the first object displayed along with the second object at the point 760 where the drag has been stopped for a certain period of time, and the first+second grouped object moved along path 770 to the folder area in response to a flick or a drag with the stopped point 760 as the start point.

Figure 8:
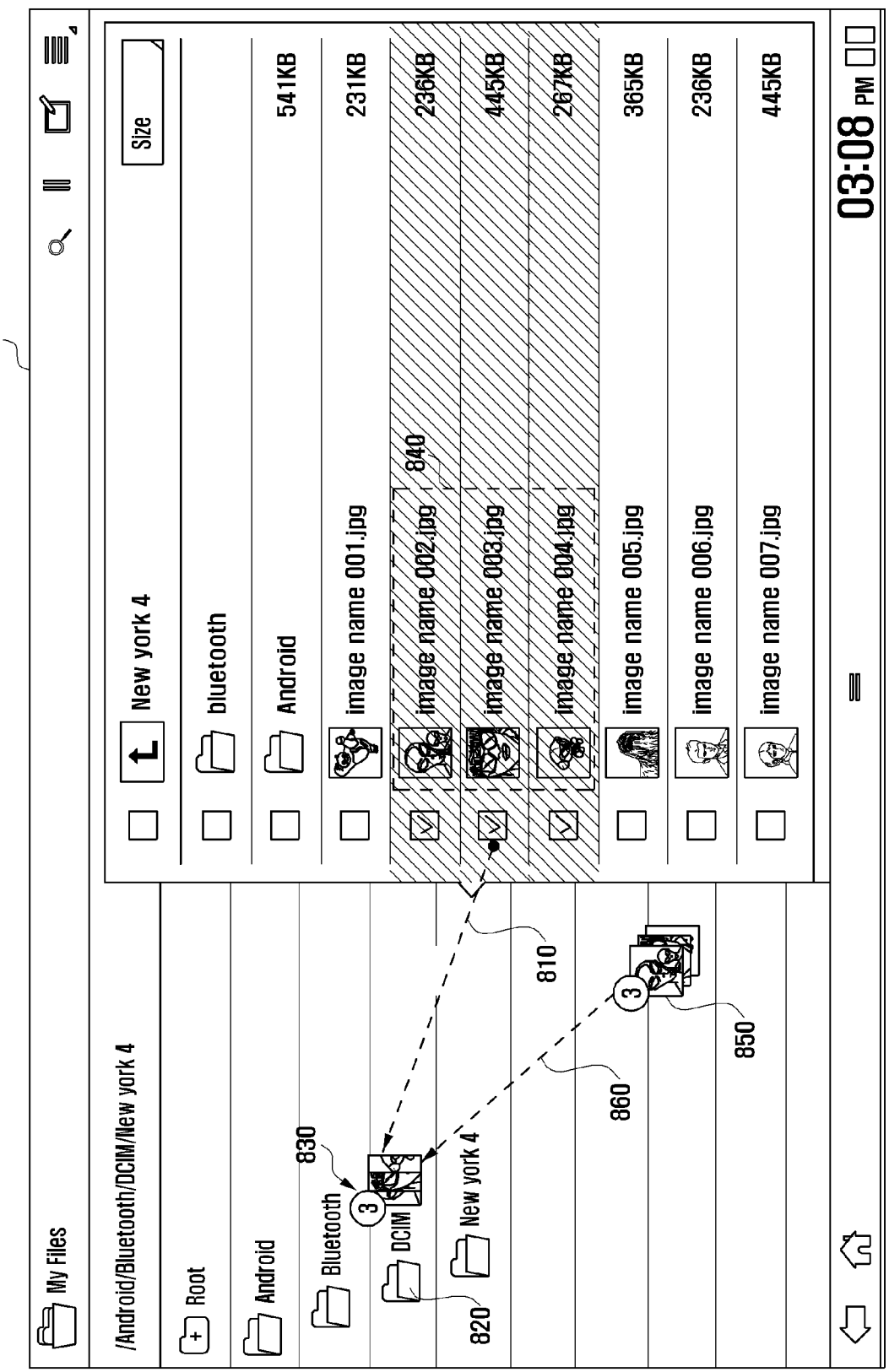

Referring to FIG. 8, the controller 150 moves or copies items 840 to a folder 820 in response to an "item copy or movement event". Here, the item copy or movement event can be a drag and drop where an object 830 positioned in the item area is dragged to the folder 820 of the folder area and is then dropped. According to such a drag and drop, the object 830 on the folder 820 disappears and items 840 related to the object 830 are moved or copied to the folder 820. Further, the item copy or movement event can be a drag and drop where the object 850 positioned at the folder area is dragged (as depicted by path 860) to be positioned on the folder 820 and is then dropped. Further, the item copy or movement event can be a touch, tap or press which selects the folder 820. As such, the object positioned at the item area or folder area is moved to be positioned on the folder 820, and as the object disappears on the folder 820, items 840 related to the object are moved or copied to the folder 820. Further, as explained above, the entire process of completing the item copy (or movement) can be consecutively performed by one touch event, for example, a drag and drop with the item display (or thumbnail display) as the start.

In addition, the movement and copy can be divided according to the event type. For example, tapping a folder 820 can be set as movement, and pressing the folder 820 can be set as copying. Further, after the process from the item display to the object movement is completed, the movement and copy can be selected by the user. For example, if a folder 820 for moving or copying is selected, the controller 150 controls an operation of displaying a pop-up window for asking whether to move and copy items, and copying or moving the items according to user's request.

Figure 9:
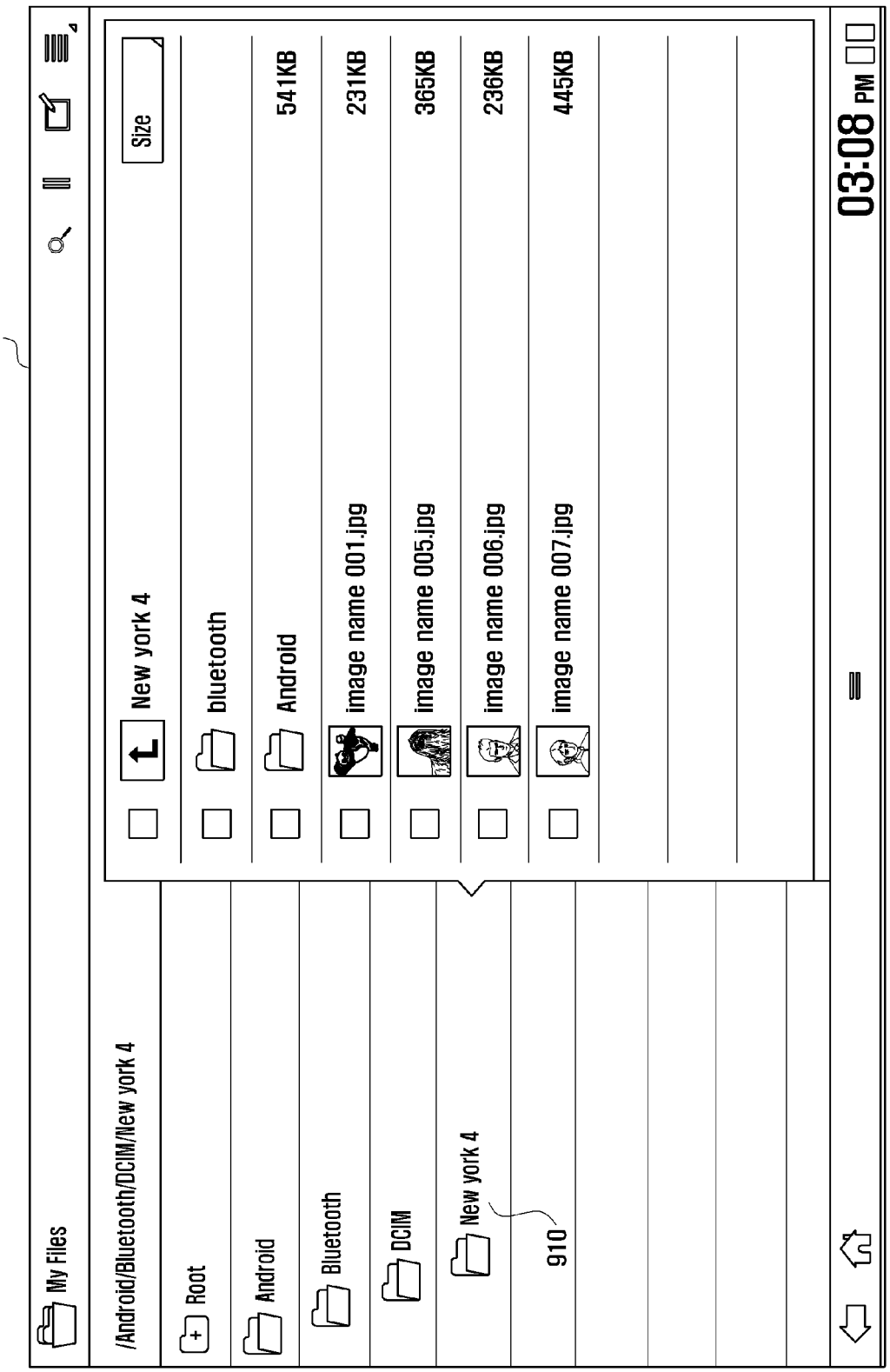

FIG. 9 shows the example screen of FIG. 8 after selected items have been moved from one folder to another. Thus, for the case where the movement of contents 840 in FIG. 8 is selected, it is understood that the contents 840 are deleted from the original folder 910 and moved to folder 820.

Figure 10:
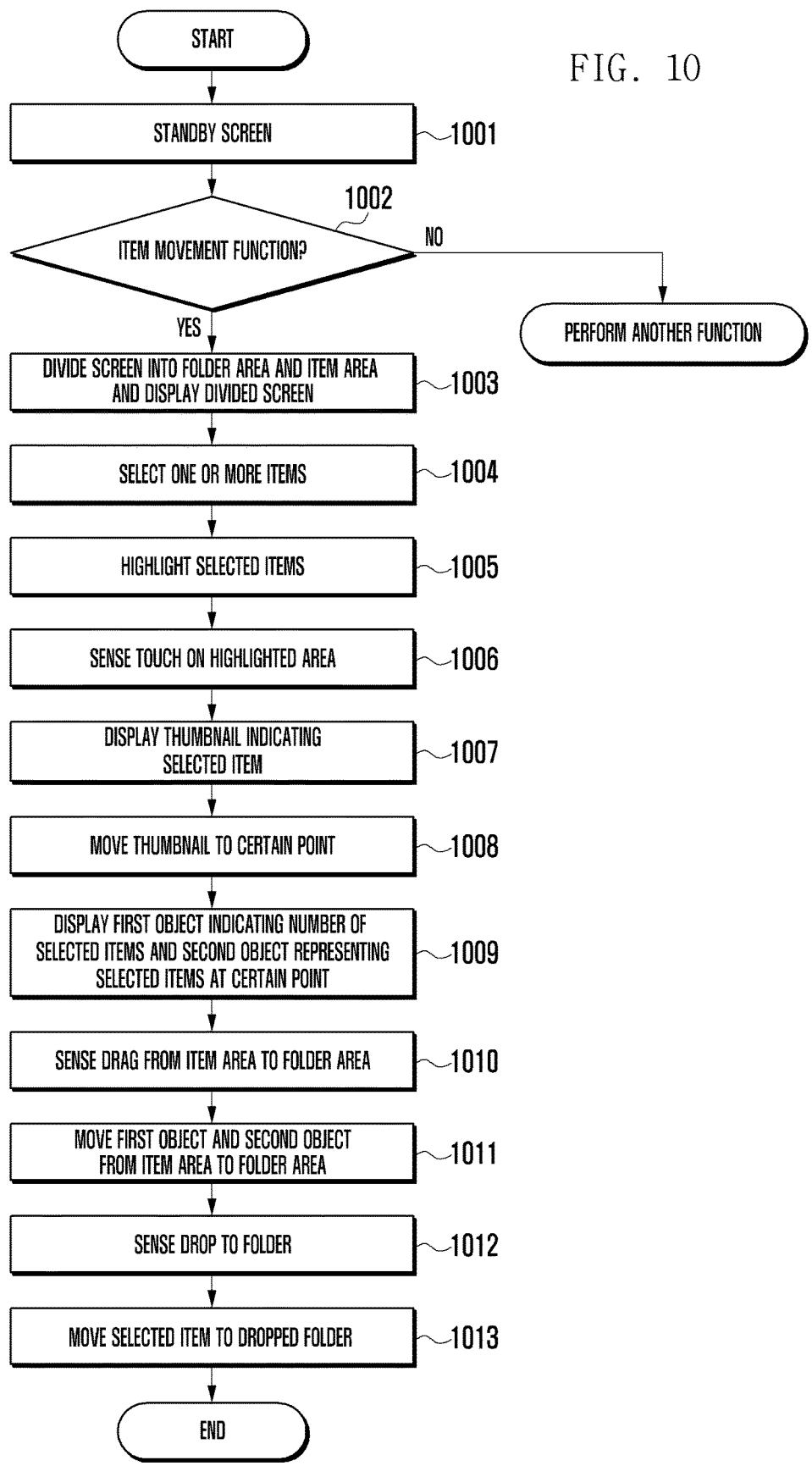
FIG. 10 is a flowchart illustrating a method of moving or copying items according to an exemplary embodiment.

FIG. 10 is a flowchart illustrating a method of moving items according to an exemplary embodiment. In the method, the display unit 130 first displays an idle screen (1001). Here, the idle screen can be a screen including multiple icons for executing applications. The controller 130 determines whether the item movement function is selected by user while such a standby screen is displayed (1002). As a result of determination at step 1002, if the item movement function is not selected, another function is performed. In contrast, as a result of determination at step 1002, if the item movement function is selected (i.e., if a touch event for selecting an album icon is selected among application icons), the process moves to step 1003.

The controller 150 controls the display unit 130 to divide the screen into a folder area and an item area (1003). The controller 150 selects one or more items existing in the item area in response to the item selection event (1004). The controller 150 controls the display unit 130 to highlight the selected items (1005). Next, if a first touch event for a highlighted area occurs, that is, a touch is sensed (1006), the controller 150 controls the display unit 130 to display the thumbnail representing the selected item (1007). Further, the controller 150 controls to display 130 to display the process of moving the thumbnail to a certain point, e.g., the touched point (1008). Next, the controller 150 controls the display unit 130 to display a first object representing the number of selected items and a second object representing the selected items (1009). Thereafter, if a second touch event occurs, e.g., a drag is sensed from the item area to the folder area with the touched point as the start (1010), the controller 150 controls the display unit 130 to display the movement process of the object along the drag path (1011). Next, if a third touch event occurs, for instance, a drop to the folder is sensed (1012), the controller 150 moves the selected item to the dropped folder (1013). Here, the first to third touch events are one consecutive touch event, i.e., a drag and drop. It is understood that such first to third touch events are not limited to one consecutive touch event, and can be formed as a combination of non-consecutive touch events as explained with reference to FIGS. 2 to 9.

Figure 11:
FIGS. 11 and 12 illustrate a user interface for moving or copying items according to another exemplary embodiment.
Figure 12:
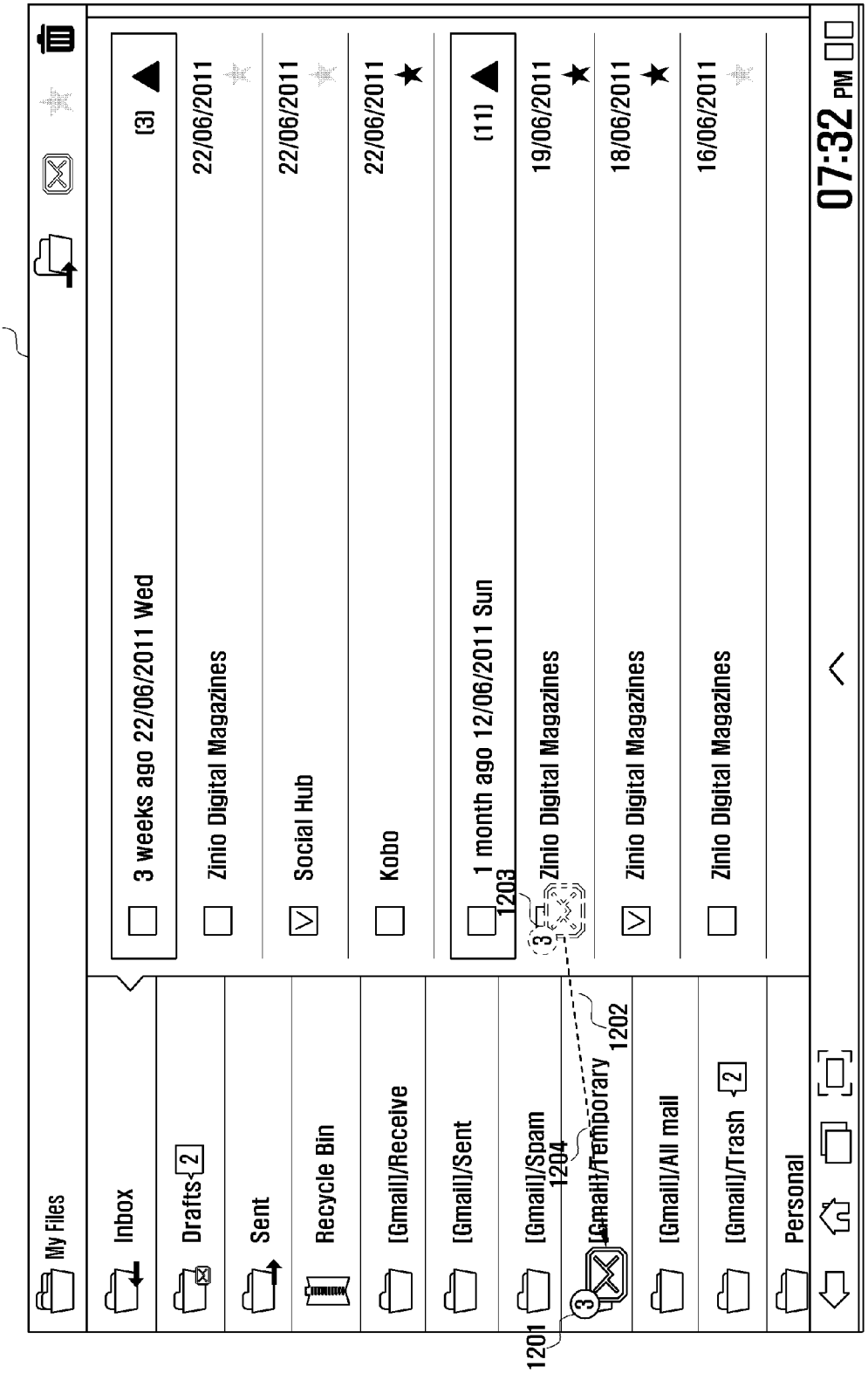

FIGS. 11 and 12 illustrate a user interface for moving items according to another exemplary embodiment. In this implementation, controller 150 runs a mailbox program and controls movement of various mailbox items on the display 125. A mailbox displayed on display 125 is divided into a folder area 1101 and a letter area 1102. Further, the display unit 130 displays letters contained in the selected folder 1103 and a check box 1104 for selecting a sub-mail folder next to the corresponding mail within the letter area 1102 or the sub-mail folder. The controller 150 controls the display unit 130 to select a corresponding letter in response to the letter selection event and highlight the selected letter. Here, the letter selection event can be a tap on the checkbox of the corresponding letter. Next, the controller 150 controls the display unit 130 to display a second object 1105 representing selected letters and a first object 1106 representing the number of the selected letters in response to the object display event. Here, the second object 1105 can be an icon representing the properties of the selected item. That is, as shown in FIG. 11, the second object 1105 can be a letter icon. Further, an object display event can be a touch on the selected area 1107 including the selected letters. If the user touches the selected area 1107 according to the control of the controller 150, the display unit 130 displays the second object 1105 and the first object 1106 at the touched position.

Referring to FIG. 12, the controller 150 controls the display unit 130 to display the process of moving 1202 an object 1201 from the letter area to the folder area in response to an object movement event. Here, the object movement event can be a drag to the folder area in an item area with the point 1203 where the object has been initially positioned as the start. Further, the object movement event can be a touch or a tap that selects a folder, e.g., a deposit box 1204. Here, for the example case of the selected letters being moved to the selected folder 1204, the selected folder can be displayed larger than other folders. Conversely, in case the selected folder 1204 is a corresponding folder of the selected letters (i.e., in case it is impossible to move the selected letters to the selected folder 1204), the controller 150 may not enlarge the selected folder 1204. The controller 150 moves the selected letters to the folder 1204 in response to the "letter movement event". Here, the letter movement event can be a drop or a tap. That is, if the object 1201 is dragged to be positioned on the folder 1204 and is then dropped, the corresponding letters are moved to the folder

1204. Further, if the user touches the folder 1204, the object 1201 is moved to the folder 1204, and if the user "drops" the letters by releasing touch contact, the corresponding letters are moved to the folder 1204.

FIG. 13 illustrates a user interface moving items according to yet another exemplary embodiment. As illustrated by screen (a), the display unit 130 displays a music list. Further, the display unit 130 highlights the tune selected according to the control of the controller 150, i.e., "Love" and "7 Things". At this time, the controller 150 controls the display unit 130 to display the object 1301 at the corresponding touch point if a touch occurs within the highlighted display area 1302. Here, the object 1301 includes a first object A representing the number of selected tunes and a second object B representing the selected tunes. Next, if a drag occurs, the controller 150 moves the object 1301 in the drag direction. Next, if a drop occurs, the controller 150 moves the selected tune to the dropped position 1303. That is, as shown screen(b), as a drop occurs at the boundary point 1303 between "Love Me For Me" and "We No Speak Americano", the select tune is moved to a position between "Love Me For Me" and "We No Speak Americano".

As described above, at least some implementations of the present invention provide the following advantage: a user can move/copy items to a desired folder by a simple touch operation, which is visually facilitated via the generation, display and enabled manipulation of special objects; and the user can observe the entire process of moving or copying items.

While embodiments have been described above in the context of a touch screen portable device, in other implementations, the methods described above can be performed in a non-touch-screen device such as a desktop PC or laptop computer. In this case, all the touch screen operations are performed by an alternative input device, such as a mouse. Thus, for example, the manipulation of the mouse is used to select various items displayed on a computer monitor display, to drag specially created objects associated with the items (e.g., the first and second objects referred to throughout this disclosure) to folders to move the associated items, and so forth.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for moving or copying displayed items on a touch screen, the method comprising:
   in response to one touch event:
   (i) detecting selection of a plurality of items for a subsequent action;
   (ii) visually distinguishing each of the plurality of selected items;
   (iii) performing a thumbnail display event by generating and displaying a plurality of thumbnails representing the plurality of selected items, in which each one of the plurality of thumbnails corresponds to one of the plurality of selected items; and
   (iv) displaying an object comprising a convergence of the displayed thumbnails;
   detecting a selection of the object after the object is displayed;
   moving the object from a first location to a second location after the object is selected; and
   moving or copying to the second location the plurality of selected items associated with the object when the object is moved and upon displaying the plurality of selected items in the second location, ending display of the object.

2. The method of claim 1, wherein the object includes a number indicating a numerical count of the plurality of selected items.

3. The method of claim 1, wherein the object is moved based on a drag starting at the first location and ending at the second location.

4. The method of claim 3, further comprising:
   detecting a drop event of the object at the second location; and
   wherein the moving or copying of the plurality of selected items occurs at the second location responsive to the detecting of the drop event.

5. The method of claim 4, wherein the plurality of selected items are dropped into a folder located at the second location.

6. The method of claim 1, wherein an input for the selection of the plurality of items is responsive to a first touch contact at one or more locations of the plurality of items, and the moving of the object to the second location is responsive to a second touch contact following a release of the first touch contact, and
   displaying another object at a same time that the object comprising the convergence of the thumbnails is displayed.

7. The method of claim 6, wherein the moving or copying of the plurality of selected items occurs at a folder located at the second location.

8. The method of claim 1 wherein:
   each one of the plurality of selected items is associated with a different icon; and
   the object includes a graphical representation of a stack of icons in which a portion of the icon of each of the plurality of selected items is visible.

9. The method of claim 1, further comprising:
   displaying multiple folders in a folder area and displaying a plurality of items, which belong to one of the folders, in an item area, wherein the second location is in the folder area.

10. The method of claim 1, further comprising:
  detecting a selection of an additional item after the object is displayed; and
  updating the object based on the selection of the additional item.

11. An apparatus for moving or copying displayed items, the apparatus comprising:
  a display unit configured to display items;
  a touch screen; and
  a controller configured to in response to one touch event:
  detect selection of a plurality of the items for a subsequent action;
  visually distinguish each of the plurality of selected items;
  perform a thumbnail display event generates and displays a plurality of thumbnails representing the plurality of selected items, in which each one of the plurality of thumbnails corresponds to one of the plurality of selected items;
  display, via the display unit, an object comprising a convergence of the displayed plurality of thumbnails in response to a touch event;
  detect, via the touch screen, a selection of the object after the object is displayed;
  move the object from a first location to a second location after the object is selected; and
  move or copy to the second location the plurality of selected items associated with the object when the object is moved and upon displaying the selected plurality of items in the second location, end a display of the object.

12. The apparatus of claim 11, wherein the apparatus includes a portable communication terminal, and the controller is further configured to display another object at a same time that the object comprising the convergence of the displayed plurality of thumbnails is displayed.

13. The apparatus of claim 11, wherein the object includes a number indicating a numerical count of the plurality of selected items.

14. A non-transitory recording medium storing code which when executed by a processor causes the processor to perform a process for moving or copying displayed items on a touch screen, the process comprising:
  in response to one touch event:
    (i) detecting selection of a plurality of items for a subsequent action;
    (ii) visually distinguishing each of the plurality of selected items;
    (iii) performing a thumbnail display event by generating and displaying a plurality of thumbnails representing the plurality of selected items, in which each one of the plurality of thumbnails corresponds to one of the plurality of selected items; and
    (iv) displaying an object comprising a convergence of the displayed icons
  detecting a selection of the object after the object is displayed;
  moving the object from a first location to a second location after the object is selected; and
  moving or copying to the second location the plurality of selected items when the object is moved and upon displaying the plurality of selected items in the second location, ending a display of the object.

15. The non-transitory recording medium of claim 14, wherein the processor and the touch screen are part of a portable terminal.

16. The method of claim 1, wherein each of the plurality of thumbnails comprise icons, and each of the plurality of selected items is associated with a different respective icon and the object includes an image of a stack of icons in which each respective icon of the plurality of selected items is at least partially visible.

17. The apparatus of claim 11, wherein each of the plurality of thumbnails comprise icons, and each of the plurality of selected items is associated with a different respective icon and the object includes an image of a stack of icons in which each respective icon of the plurality of selected items is at least partially visible.

18. The non-transitory recording medium of claim 14, wherein each of the plurality of selected items is associated with a different respective icon and the object includes an image of a stack of icons in which each respective icon of the plurality of selected items is at least partially visible.

* * * * *